United States Patent [19]

Brown, Jr. et al.

[11] Patent Number: 4,967,825
[45] Date of Patent: Nov. 6, 1990

[54] HIGH RESOLUTION REPLICAS

[75] Inventors: R. Malcolm Brown, Jr., Austin, Tex.; Shun Mizuta, Kochi, Japan

[73] Assignee: Board of Regents, The University of Texas System, Austin, Tex.

[21] Appl. No.: 216,762

[22] Filed: Jul. 8, 1988

[51] Int. Cl.$^5$ ............................................ B22D 23/00
[52] U.S. Cl. ........................................ 164/46; 427/4; 427/250
[58] Field of Search ....................... 164/46; 427/4, 250

[56] References Cited

U.S. PATENT DOCUMENTS

| | | | |
|---|---|---|---|
| 4,278,701 | 7/1981 | von Hagens | 427/4 |
| 4,447,374 | 5/1984 | Tanaka | 427/4 |
| 4,582,111 | 4/1986 | Kuehn et al. | 164/46 |

OTHER PUBLICATIONS

Haigler et al. (1980), *Science,* 210:903-906.
Muller et al. (1985), *Ultramicroscopy* 16:340-348.
Ruben (1987), *Carbohydrate Res.,* 160:434-443.
Zasadzinski et al. (1988), *Science* 239:1013-1015.
Elings (1988), *Microscopy/Bioanalytical Techniques,* Apr. pp. 124.
Amrein et al. (1988), *Science,* 240:514-516.
Fujikawa, Seizo, "Negative Staining", *Journal of Microscopy,* vol. 117, Pr. 2, (Nov. 1979), pp. 261-267.
Pickhardt, Vincent, "Fabrication of High-Strength Unsupported Metal Membranes", *J. Vac. Sci. Technol.,* vol. 14, No. 3, (May/Jun. 1977), pp. 823-825.

*Primary Examiner*—Richard K. Seidel
*Attorney, Agent, or Firm*—Arnold, White & Durkee

[57] ABSTRACT

Disclosed are improved methods for preparing high resolution replicas for electron microscopic analysis. Replicas are prepared having a resolution capability less than ten angstroms, with structures of even less than five angstroms being readily discernible. Particular aspects of the invention concern the use of a platinum/-carbon evaporant to prepare extremely thin replica surfaces which allow the visualization of structures heretofore unresolvable. The replication is performed at high vacuum, on the order of $10^{-5}$ Torr or better, with continuous rotation of the sample to allow for an even distribution of the evaporant. The resultant replica surfaces are on the order of no more than 5 to 10 angstroms thick. The replica technology disclosed herein is applicable to both biological as well as non-biological samples, including tissues, biochemicals, metals and polymers and even computer chips and superconductor surfaces.

20 Claims, 2 Drawing Sheets

HIGH RESOLUTION REPLICAS

BACKGROUND OF THE INVENTION

1. Field of the Invention

This invention relates to the high resolution replication of specimens, including both biological and non-biological specimens, and the use of such replicas in high resolution microscopic analyses. In particular aspects, the invention concerns the preparation and use of replicas of biological samples such as cells, tissues and the like, as well as non-biological materials obtained therefrom, in connection with freeze-fracture, freeze-etching and related microscopic techniques. Moreover, the invention contemplates the applicability of the disclosed replica technology in connection with a wide variety of microscopic techniques including transmission electron microscopy (TEM), scanning electron microscopy (SEM), scanning tunneling microscopy, and even atomic force microscopy.

2. Description of the Related Art

More and more, the use of microscopic analysis in both biological and materials sciences has become an extremely important adjunct to investigational as well as quality control analyses. Electron microscope replication techniques were devised during the 1940s by workers in the materials sciences, particularly metallurgy, for the examination of surface topography (see, for example, Mahl, H. (1040), Z. Techn. Phys.. 21:17, and Gerould, C. H. (1947), J. Appl. Phys., 18:333). While these early techniques have now become largely obsolete, they nevertheless demonstrated the particularly usefulness of surface examination in the material sciences.

In the biological sciences, surface examination has been equally important. Structural analyses of biological substances, including biological samples such as cell components as well as biochemicals such as enzymes, receptors, etc., have played a major role over the years in obtaining a spatial resolution of structural relationships. This has, as one might well imagine, led to numerous breakthroughs in cell and molecular biological investigations, not the least of which has been a delineation of cell surface receptor structure/function relationship.

Transmission electron microscope technology has certain inherent limitations. For example, in transmission electron microscopy, when one desires to view a specimen directly, it must be sufficiently thin to allow the transmission of electrons. Certain very small specimens are inherently electron-transparent and may be viewed directly by a variety of means, including shadowing. Most specimens, however, are too thick to allow electrons to be transmitted, and a variety of thinning techniques have been developed allowing internal structure to be studied. However, transmission analyses, per se, do not allow the observation of surfaces of structures and rather are limited to the investigation of internal structure.

As alluded to above, a variety of techniques have been developed over the years which approach the problem of surface analyses of structures, as opposed to analyses of internal structure. One such approach is referred to generally as the replication of specimens or "replica" technique. In these techniques, a thin electron-transparent layer, which faithfully molds the surface contours, is prepared and then stripped from the specimen and analyzed microscopically. Contrast in such replicas results from the contour of the surface being replicated, as well as the use of shadowing techniques which employ the deposition of a metal or otherwise electron-opaque film on the surface. For a very helpful text which covers most all of the general aspects of specimen replication, see Willison et al. (1980), Practical Methods in Electron Microscopy, Volume 8: Replica, Shadowing and Freeze-Etching Techniques, North-Holland Publishing Company, ed. Audrey Glauert, pp. 1-101, incorporated herein by reference.

The principal disadvantages associated with replica techniques generally concerns the fact that the replica is not always able to faithfully form a contour of the surface being replicated. While techniques have been devised for the replication of virtually every type of surface (see, e.g., Bradley, D. E. (1965), Replica in Shadowing Techniques, In: Techniques for Electron Microscopy, Second Edition, D. H Kay, ed., Blackwell Oxford), problems nevertheless arise with regular surfaces, as well as surfaces where a high degree of resolution is required to view the particular structure. The problem of resolution is particular acute where one desires to observe the macromolecular morphology or tertiary structure of enzymes, nucleic acids, structural proteins, glycoproteins, polysaccharides, or the like.

In general, the currently available replicating techniques are inadequate for viewing structures below 15 to 20 angstroms. This lack of resolving capability greatly reduces the usefulness and versatility of the replication in connection with a wide variety of applications. For example, many important quality control applications in the field of computer technology (e.g., in chip manufacturing) would be much better served were there the capability available for viewing extremely minute structures on chips, e.g., in determining their uniformity of manufacture. Moreover, in the biological sciences, many important cell-surface structures are somewhat smaller than 15 to 20 or even smaller than 10 angstroms, thus, requiring greater resolving capabilities than currently available by the replica technique.

Accordingly, there is currently a need for improved techniques in the replica technology area, a need which has prior to now gone unaddressed. In particular, there is a need for improvements in replication technology which can be applied using essentially existing hardware, both in terms of the replica-forming hardware as well as the microscope hardware, without a requirement for expensive, complex or hard-to-use techniques. Moreover, there is a particular need for techniques that can be applied in virtually any laboratory across the country without a requirement for extensive training or expertise.

SUMMARY OF THE INVENTION

Accordingly, it is a general and overall object of the invention to address these and other disadvantages in the art of replication technology.

It is a more particular object of the invention to provide improved techniques for preparing replicas, and in particular, replicas having a very high level of resolving capability.

It is a still more particular object of the invention to provide a method for preparing improved high resolution replicas which may be employed in connection with either biological materials or non-biological materials, the replica being generally capable of resolving structures of less than 10, or even 5, angstroms.

It is even a still further object of the invention to provide a method that is simple, inexpensive and easy to use, requiring only those materials readily available to those individuals of skill in the art of replica technology.

Therefore, the invention arises in a general and overall sense out of the inventors, realization that a surprising improvement in the resolving capability of a replica may be observed when one prepares the replica with certain considerations in mind. In this regard, the inventors have discovered that three general considerations are more or less crucial to the successful preparation of high resolution replicas. These considerations include: (1) forming the replica under a sufficiently high vacuum, (2) rotating the specimen while the replica is being formed, and (3) uniformly layering the replica-forming evaporant into the surface of the specimen at a thickness of generally less than 10 angstroms.

Accordingly, in certain aspects, the invention is directed to a method for preparing an improved high resolution resolution replica, the method including the steps of:
(a) placing a specimen for which the replica is to be made upon a rotatable platform in an enclosable system;
(b) evacuating the system to form a vacuum sufficient to provide a mean free path for a selected evaporant;
(c) rotating the specimen;
(d) forming a replica of the specimen by a process which includes uniformly directing a selected evaporant onto the surface of the rotating specimen to provide a layer having a thickness of generally less than 10 angstroms.

The specimen which is selected may be either a biological or non-biological specimen. Typically, biological specimens will include cellular as well as subcellular components, tissue structures, macromolecules such as enzymes, receptors, etc., and even nucleic acids, glycoproteins, polysaccharides, or the like. In the case of non-biological specimens, typical applications will include, in general, applications in the materials science such as viewing of carbon fibers or synthetic polymers, but also include applications in connection with computer chips, integrated circuit boards, ball bearings or other metal surfaces, or even any polymer surface.

As will be appreciated by those of skill in the art, the principal difference in the preparation of replicas for biological versus non-biological specimens, will be the temperature at which the replica is formed. In general, biological specimens will require that a very low temperature be maintained in order to preserve biological integrity, generally temperatures on the order of $-100°$ C. down to $-200°$ C. However, in the case of non-biological samples such as computer chips, or metal surfaces the temperature of replica formation is not nearly so crucial, and temperatures on the order of $0°$ C. to $100°$ C. may be employed.

To allow for subsequent rotation of the specimen during the formation of the replica, it is convenient to place the specimen upon a rotatable platform positioned to allow direct access to the specimen by the evaporant that is employed for replication. Moreover, in that the replica formation must be performed in a very high vacuum, it will be necessary to employ an enclosable system so that a sufficient vacuum may be maintained in the area surrounding the specimen wherein the replica will be formed. Typically, the enclosable system will comprise a structure such as a bell-shaped cover, or the like, over the rotatable platform or stage upon which the specimen is to be placed. The bell-shaped cover will typically have a seal around its bottom edge, such that a high vacuum may be achieved within the interior of the bell covering thus placing the specimen within the vacuum.

The formation of the vacuum is an important aspect of the invention. It has generally been recognized that a vacuum of at least $10^{-4}$ Torr is an appropriate vacuum for preparation of replicas. However, the present inventors have discovered that a greater vacuum is required to achieve the high resolution replicas of the present invention. Generally speaking, the system must be evacuated to form a vacuum sufficient to provide a mean free path for the selected evaporant. The term "mean free path" refers to a vacuum that is sufficiently great to prevent the appreciable collision of air or other gas molecules with the evaporant during the layering process. Typically, in the case of a heavy metal evaporant which is the most generally used type of evaporant, the system must be evacuated to at least $10^{-6}$ Torr prior to forming the replica, as well as maintenance of the vacuum of at least $10^{-5}$ Torr during formation of the replica. Therefore, the present invention generally requires the achievement of a vacuum that is some 100-fold greater than is standard for the art. While most currently available vacuum pumps are capable of achieving a vacuum of this degree, it was previously not generally thought to be crucial to the successful formation of high resolution replicas to employ a vacuum of $10^{-6}$ Torr.

As noted, the selected evaporant will typically comprise a heavy metal evaporant, for example, one selected from group consisting of platinum, gold, tungsten, phosphotungstate, and tantalum. However, as is appreciated in the art, where a heavy metal evaporant is employed it is typically necessary to employ a co-evaporant such as carbon, as to prevent decoration of the replica by crystalization of the pure metal by nucleation. In addition to the foregoing more preferred heavy metal evaporants, one could also employ materials such as uranium, lead or even molybdenum. However, these materials are not particularly preferred in the practice of the high resolution techniques of the present invention.

It is particularly important in the practice of the invention to rotate the specimen during application of the evaporant. This is, of course, most readily achieved by rotating the platform upon which the specimen is mounted or placed. Typically, one will desire to rotate the specimen at from about 0.5 to about 2 rotations per second during application of the evaporant. However, more preferably, the specimen is rotated at about 1 rotation per second. The rotation is believed to be important in that it assists in insuring that a uniform layer of the evaporant is coated on the surface of the specimen, thus allowing a coating of all surfaces of the specimen.

As noted, evaporation of a metal, or more preferably a heavy metal, is the preferred method for application of the replica-forming material onto the surface of the specimen. Vaporization of the metal allows for transit and deposition of the metal in the most uniform and consistent manner, and may be most simply achieved by raising its temperature above its boiling-point in a vacuum. Electro-thermal heating using filaments, and electron-beam heating, are the two most commonly used procedures, although sputter-coating can also be employed.

The angle of evaporation is important, although not believed to be crucial, to the successful practice of the invention. As used herein, the angle of evaporation refers to the angle formed between the source of the evaporant and the plane of the platform, or the plane of the specimen that will ultimately be viewed on the replica. While virtually any angle of evaporation can be employed, from 0°-5° up to 80°-90°, and still obtain advantages in accordance with the invention, the more preferred angles are generally less than 45°. The most preferred angle of evaporation in the practice of the invention is about 25°.

The actual amount of the evaporant that is coated onto the surface of the specimen, in terms of the general thickness of the applied layer, is believed to be an important aspect of the invention. The inventors have discovered that, contrary to the general understanding in the art, extremely thin shadowing or contouring layers of replicas can successfully be prepared without the occurrence of nucleation, and that such thin contouring films can be employed to successfully resolve structures of equal to or less than 5 to 10 angstroms.

The achievement of deposited films of less than on the order of 10 angstroms (or even less than 5 angstroms) require not only a careful attention to the other factors noted above (most importantly, the sample rotation and vacuum considerations) but also close attention to the evaporation process itself, to ensure an extremely light deposition. Preferably, one employs a quartz crystal monitor to ensure a general thickness of less than about 10 angstroms. However, the invention can successfully be employed without such a monitor. Where a quartz crystal monitor is not available, one can employ a white card mounted about 1 cm below the plane of the specimen. Evaporation is halted when a slight discoloration of the card is noted (from white to greyish/brown) as opposed to a dark grey/black color achieved during the formation of typical prior art replicas (usually on the order of about 15 to 30 angstroms). Where a Balzers 360 replication instrument is employed, a proper coating is typically achieved in accordance with the invention by placing the evaporant source about 10-15 cm from the sample, and allowing electron beam evaporation to proceed for about 60-75 seconds at a beam current setting of about 60-80 milliamperes.

DETAILED DESCRIPTION OF THE PREFERRED EMBODIMENTS

Although the invention is applicable to both biological as well as non-biological specimens, the present disclosure is being exemplified principally in terms of biological specimens — biological specimens tend to present the most complexities in terms of replication technology and, therefore, can serve as an essentially all-encompassing example. The only essential difference between the replication of biological and non-biological specimens is that in the case of non-biological specimens, the temperature of replication is not particularly critical.

The most common application of replica technology, as well as potentially the most useful application, in the biological sciences is through the use of the technique known as freeze-fracturing and freeze-etching. In freeze-fracturing, a frozen sample is fractured and a replica of the fractured surface is prepared while the sample remains in a frozen state. Freeze-etching is a slight modification of this technique in which some of the ice in the aqueous sample is sublimed ("etched") from the fractured surface before the replica is prepared. However, the term "freeze-etching" is widely used to encompass both freeze-fracturing and freeze-etching, regardless of the extent to which etching has occurred.

In general, the freeze-etching process in accordance with the present invention involves various discreet steps. The first step is freezing of the biological sample in a manner which avoids or minimizes the occurrence of ice crystal formation in the sample, emplacement of the sample on a cooled rotatable stage or platform, and fracturing of the sample to present a fractured surface upon which to form the replica. Fracturing is an important step in that it reveals internal structures for surface study by replica technology. Following fracture, the sample is sublimed ("etched") by vacuum to remove ice crystals. Following sublimation, the evaporation of the heavy metal replica-forming material is performed in the manner of the invention so as to form the high resolution replica in accordance herewith. Following replica formation, a carbon backing film is deposited onto the surface of the replica, and the completed replica is floated onto water so as to remove the replica from the biological sample. After obtaining the replica in this manner, it is transferred to an acid solution for cleaning, followed by washing and subsequently transferred to an electron microscope grid for viewing under the electron microscope. (Note: the sample can also be viewed with a tunnelling microscope.)

The freezing process is important to the preparation of a high resolution replica of a biological sample. It is important that the sample be rapidly frozen in order to prevent ice crystal formation on the sample, which distorts or reduces the occurrence of the subsequent replica. Ice crystals form when a water-containing specimen is frozen. Ice crystal development begins at nucleation points and water migrates from the surrounding medium to provide a material for ice crystal growth. At the solute concentrations found in most biological specimens, ice crystal grown ceases at temperatures below a range of about −2° C. to −80° C. The lower end of this range is described as the "recrystalization point" in that if a rapidly frozen specimen, cooled to a temperature below this point, is then allowed to warm up above the recrystalization point, then ice crystal growth will restart.

The present inventors have determined that the preparation of high resolution replicas of biological materials require a very careful control of the temperature to avoid ice crystal formation. In general, the temperature must be maintained below $-100°$ C. (Note: when the specimen is fractured, the temperature can be too cold. At temperatures lower than $-190°$ C. fractured surfaces can be contaminated by water vapor. Therefore, such temperatures should be avoided during the fracturing stage). The preferred method for quick freezing a biological specimen involves their being frozen in liquid propane which had been cooled with liquid nitrogen. The frozen specimens may then be transferred to liquid nitrogen alone prior to their insertion into a replica holder, or the like. The use of liquid nitrogen-cooled liquid propane is preferable to liquid nitrogen alone in that it provides a much more uniform and rapid cooling of the sample than does liquid nitrogen alone.

It is generally unlikely that any freezing technique will be sufficiently rapid to avoid all ice crystal formation. Thus, some ice crystal formation is bound to occur at some points within the specimen. Thus, the goal is typically to ensure only very small and uniform ice crystal formation. The freezing rates necessary to obtain uniformly small ice crystals at the solute concentrations found in most biological systems are somewhat difficult to obtain in practice. For this reason, it may be preferable for some applications to employ a cryoprotectant in order to reduce ice crystal formation altogether. A cryoprotectant such as glycerol, ethylene glycol and dimethyl sulphoxide (DMSO) can be employed for such purposes. Cryoprotectants serve to remove water from the sample and replace the water with cryoprotectant molecules. The principal disadvantage to the use of a cryoprotectant is that the cryoprotectant itself will tend to distort the ultrastructure of the specimen. Using the liquid propane/liquid nitrogen quick freezing method disclosed herein, the present inventors have typically found that a cryoprotectant is not needed in order to minimize ice crystal formation.

Following freezing of the specimen, the specimen support containing the frozen specimens is inserted into a replica holder, such as a Balzers double replica holder, and placed into an appropriate freeze-etch device for fracturing and subsequent shadowing, etc. A preferred freeze-etched device is the Balzers BA 360M freeze etch device (Balzers Corp., Balzers, Liechtenstein). It has been found by the present inventors that the temperature of fracture is an important aspect of the invention. As noted above, it is important that the sample be maintained at a temperature below $-100°$ C. However, it is similarly important that the fractured specimen not be allowed to warm above the temperature of liquid nitrogen ($-196°$ C.) and then have its temperature reduced back to the temperature of liquid nitrogen. This is due to the fact that the fractured surface can be contaminated with water vapor and subsequent recooling of the sample to the temperature of liquid nitrogen can result in the ice nucleation effect. The preferred range for the fracturing temperature is thus on the order of $-100°$ C. to $-150°$ C., with an even more preferred range of $-130°$ C. to $-150°$ C.

When the frozen specimen is removed from liquid nitrogen and placed onto the rotatable platform, it is important that the platform or stage itself be cooled to an appropriate temperature. The inventors have found that a temperature of about $-150°$ C. is preferred for the stage during the fracturing process.

For fracturing, the frozen specimens in an appropriate specimen holder are placed onto the frozen stage, the system enclosed with an appropriate cover, and the air within the system evacuated to an appropriate degree. The obtaining of a high degree of vacuum is an important aspect of the invention. It is critical that a vacuum of at least $10^{-6}$ Torr be obtained before the specimens are fractured. It has been found that a vacuum on this order can be obtained using conventional vacuum techniques such as an oil diffusion pump backed with a mechanical rotary pump. However, using these conventional devices may require a somewhat extended period of time to achieve the required vacuum. For example, typically it will take approximately 20 to 40 minutes to obtain a vacuum of $10^{-6}$ Torr. Alternatively, one may desire to employ a cryopump or turbo molecular pump which will offer certain additional advantages, such as a high vacuum in a shorter amount of time as well as a cleaner overall vacuum with less contamination.

Once a vacuum of $10^{-6}$ Torr is achieved, the specimen is ready for fracturing. Immediately prior to fracturing, the temperature is typically brought up to $-130°$ C. from $-150°$ C. in order to reduce contamination of the fractured surface. Following fracturing and prior to replica formation, it is typically desirable to etch the surface of the fractured specimen by sublimation. Sublimation is a process whereby ice is removed from the surface of the specimen by the action of the high vacuum and the reduced temperature. By sublimation, the ice is converted directly to a gas without going through an aqueous phase, thus reducing the chance of damage to the specimen. Sublimation or etching is also important in that it reveals additional surfaces of the biological material for replica formation.

The preferred method for etching in accordance with the invention is somewhat unconventional relative to previous techniques. In a preferred embodiment, immediately following specimen fracture, stage rotation is begun at one revolution per second. The stage is allowed to rotate for about 5 to 60 seconds (preferably about 15 seconds) and the stage temperature then turned down to about $-150°$ C. Sublimation then occurs during the time of fracture including the time it takes the stage to stabilize at a temperature of $-150°$ C. This time typically is 15–30 seconds. Typically the etching process is complete after the stage has stabilized at $-150°$ C. for about 5 to 60 seconds (preferably about 30 seconds).

Following sublimation, the specimen is ready to receive the evaporant, thereby forming the replica. Shadowing is effected preferably using an electron beam evaporation gun, such as that obtained from Balzers, operating at on the order of 2,000 V and 90 mA. It is critical to the successful practice of the invention that only a very small amount of platinum/carbon, or other selected evaporant, be evaporated onto the surface. This is achieved by monitoring two important parameters: the vacuum status of the system and the amount of material being deposited onto the sample. The vacuum is important for a number of reasons including the maintenance of a mean free path that is sufficient to avoid interaction of evaporant molecules with air molecules and also to avoid outgassing from excessive heating during the evaporation process.

Without careful monitoring of the vacuum, it can easily rise to above $10^{-5}$ Torr. This is partly because of the problem of outgassing. Outgassing occurs when the metal or carbon is evaporated and can result in a significant decrease in the vacuum, well above $10^{-5}$ Torr. Prior to the present invention, it was conventionally thought that vacuum was not so crucial such that outgassing would create a problem. However, in accordance with the present invention, it is now known that one must maintain a vacuum of at least $10^{-5}$ Torr during evaporation. If the vacuum rises above $10^{-5}$ Torr evaporation must be discontinued until a sufficient vacuum is again achieved.

The amount of material deposited onto the specimen is similarly crucial. This may be monitored visually (e.g., through the use of a white indicator sheet) or through the use of a quartz crystal monitor. In the case of a visual monitoring, one desires to continue evaporation until only a light greyish/brown color is detected on the indicator sheet. This is in contrast to the typical prior art approach which is to obtain essentially a greyish/black coloration on the sheet. Where a quartz crystal monitor is used, one will desire a layer of less than about 10 angstroms, more preferably, about 5 angstroms.

After the appropriate degree of shadowing has been effectuated, the replica is ready to be completed through the layering of an appropriate backing material, such as evaporated carbon. Where a carbon evaporant is employed, the following technique is preferred. The stage rotation is generally decreased relative to that used by the shadowing step and is not particular crucial. Typically, a stage rotation of about 1 revolution every 5 to 10 seconds is adequate. Moreover, carbon layering is preferably achieved from an angle of about 90° as opposed to the 20° to 30° angle preferred for shadowing. Unlike the shadowing step, the carbon layering is not crucial in terms of the thickness of the layer achieved. This is due to the fact that the carbon serves only as a mechanical backing and is not sufficiently scattered by electrons to alter the electron microscopic visualization of the sample (carbon is electron-transparent and appears as empty spaces in subsequent electron micrographs). Moreover, the vacuum is not particularly crucial at this stage, however a vacuum of between $10^{-5}$ Torr to $10^{-6}$ Torr will typically be preferred.

Following application of a backing member, the specimen is ready to be removed and the replica recovered therefrom. The vacuum is released from the system and the specimen holders containing the replicas and specimens removed. The specimens are then removed from the sample holders and layered gently onto, first, 70% ethanol for several seconds and then removed to distilled water. Following application of the distilled water, the specimen will generally still be attached to the holder, while the replica floats off from the specimen The replica is then removed with forceps or the like and transferred to a cleaning solution, such as chromic acid/sulfuric acid solution (e.g., 50% sulfuric acid and 5% sodium dichromate). The replica is generally left floating in this solution, and following a cleaning for approximately 12 to 24 hours in the acid solution, is removed, cleaned with distilled water and is now ready for transfer to a grid for microscopic analysis.

The examples which follow illustrate the practice of the invention by the inventors in terms of preferred embodiment. It will be appreciated that the examples which follow were conducted in connection with standard laboratory procedures discovered by the inventors to perform well in the practice of the invention. Unless otherwise indicated, it will be appreciated by those of skill in the art that various modifications and changes may be made and the standard procedures employed. The first example, Example I, relates to the actual procedure for preparing high resolution replicas employed by the inventors. The second example, Example II, illustrates the use of these procedures in connection with a research endeavor of the present inventors, the study of the cellulose synthesizing complex in the xanthophycean alga Vaucheria hamata.

EXAMPLE I

HIGH RESOLUTION FREEZE FRACTURE/REPLICA

1. Specimen Preparation

For biological specimens, copper planchets were used and the double replica technique was used instead of microtoming with the knife. Two copper holders of different sizes in depth were matched. These had been previously cleaned only in distilled water and wiped dry with a tissue. ETOH was not used. This was believed to be important to prevent too much cleaning and therefore excessive outgassing which could cause contamination.

Two double-replica holders were employed. The newer one made by Balzers, Inc. was used only to load the planchets. They were placed into the holder and matched so that when the holder was closed, the two planchets sandwiched into one.

Freshly prepared yeast paste was placed on each holder, then the sample was added, and the double replica holder folded. The paired sample was then picked up from the folded block with a pair of fine tweezers.

2. Freezing

Although a variety of freezing methods could be used, it was found to be important to have sufficiently rapid freezing to prevent ice crystal damage to the biological specimen. For this reason, the sample was rapidly plunged into liquid propane cooled with liquid nitrogen which was placed into an aluminum reservoir. It is important not to over fill the reservoir. These operations were performed in the hood with blower on.

The sample was maintained in propane for only 1–2 seconds, then transferred to liquid nitrogen for storage until needed. The sandwiched samples were handled carefully to avoid pre-fracture. All samples were prepared in this manner before loading into the double replica holder for fracture.

2. Loading Samples

With careful technique, it was found to be possible to simultaneously fracture and shadow 6 samples, each with 2 complementary sets. To do this, an older hinged double replica device was employed. The techniques described below were followed to avoid contamination. Cleaning of the double replica holder was performed with a dry tissue. EtOH or organic solvent were never used. The goal was to keep the surface pristine and with the layer of shadowed material on the surface of the metal. It was felt that outgassing might take place if the metallic surface was exposed. The general steps were as follows:

A. The double replica device was placed in liquid nitrogen, closed, and held vertically.

B. The samples were carefully loaded into the slots, 2 per slot.

C. Small wooden sticks were used to prevent samples from being "slung" out during rotary shadowing.

Samples in the holder were staged in the liquid nitrogen until ready to transfer to the BA 360 (Balzers 360) unit.

4. Preparation of the Electron Gun and Carbon Evaporation Unit

A Balzers electron gun (Balzers Corp., Balzers, Liechtenstein) for the platinum/carbon evaporation, and a Balzers resistance heating electrode (Balzers, Corp., Balzers, Liechtenstein) is preferred for the carbon evaporations. However, in practice of the invention, generally any commercially available electron gun and resistance evaporator will work.

With the Balzers E gun, it was generally possible to get approximately 3-4 runs before the pellet and carbon rod needed to be replaced. However, between each run, it was found to be essential to clean the parts with a dry tissue paper (never any EtOH). To clean the gun, the outer gun shield was removed with the two screws and blades gently wiped with a tissue wrapped over a screw-driver. The inner gun shield was then removed and the interior cap cleaned with a dry tissue. The flat plate where C-rod protrudes was also cleaned using a tissue over a screwdriver. The cathode was not touched during cleaning.

The cathode and C-rod was examined to ensure that it protruded through the coil and was aligned with the first gyre. The gyres of the cathode should not be touching.

After cleaning, the gun was reassembled in reverse order. It is important that the inner cover assembly not touch to ground. The cover should be approximately 1 mm from contact. The E-gun was installed in the Balzers and the angle of inclination was set to 25°. This was the preferred inclination, but it could vary from 10–45 degrees.

The carbon evaporation holder was cleaned with a dry tissue and a new carbon rod sharpened. A flat carbon rod was also made. The carbon evaporation device was then installed in the BA 360.

5. Set-up Conditions for evaporation

A. The stage was precooled to −150° C. and the sample was transferred from the liquid nitrogen and mounted upon the cooled stage. A dry evaporation card was placed immediately below the sample as an indication means for measuring the degree of metal evaporation and deposition onto the sample. (Where available, one may wish to employ a quartz crystal monitor, which can very accurately measure the degree of subsequent evaporant deposition).

B. It is very important that the vacuum should have reached at least $1 \times 10^{-6}$ Torr prior to fracturing of the frozen mounted sample. It may take 30 minutes or longer to reach this vacuum. The means of achieving the vacuum can be varied, but with the present system, an oil diffusion pump which is connected to a rotary pump was used. The diffusion pump was sufficiently baffled to prevent back streaming and contamination from the diffusion oil. (A cryo pump may also be employed, and may provide a cleaner overall system). With the Balzers device, however, for an optimum vacuum to be reached, the stage must be set at −150° C. and liquid nitrogen should be introduced into the microtome arm. The microtome arm was eventually cooled to the temperature of liquid nitrogen (−195° C.) as evidenced by liquid nitrogen outflow from the system and a sensor which detected the liquid nitrogen. Note: a reservoir holds liquid nitrogen in the microtome arm for approximately 10 minutes after the sensor detects the liquid nitrogen. It is during this time that the evaporation is made.

C. While waiting for vacuum to be reached, the stage rotary control was set to 1 revolution per second, the high voltage on the E-gun set to 2200 volts, and the carbon voltage rheostat set to 8.2 volts. The fiber optic light was turned on for visualizing the entire operation through a port window in front of the bell jar.

6. Etching

Etching was performed in a somewhat unconventional manner, but in a way which promotes very little contamination.

First, the pressure on the liquid nitrogen tank inlet which supplies the specimen stage and microtome arm was increased to 0.7. The stage temperature increased from −150° C. to −130° C. The stage temperature was allowed to stabilize at −130° C. for 4-5 minutes even after the temperature gauge read −130° C. This insured that the stage had actually reached −130° C. Using the chilled microtome knife, the double replica holder was opened and the knife immediately placed in the back part of the bell jar. Stage rotation was started immediately at 1 rev/sec.

Immediately after starting specimen rotation, timing was began. After 15 seconds, the stage temperature was turned down to −150° C. It generally took approximately 15-30 seconds to reach this temperature, during which time sublimation was taking place. When the temperature gauge reached −150° C., timing was started. After 30 seconds had passed, the sublimation and/or etching process was complete.

7. Platinum/Carbon Evaporation

It is critical that only a very small amount of platinum/carbon be evaporated on the specimen. This was achieved by monitoring two important parameters: vacuum status and visual observation of deposit on the paper. It is important that the vacuum not be allowed to rise above $10^{-5}$ Torr during the evaporation. If the pressure rises, immediately lower the beam current on the platinum/carbon electron gun until pressure subsides, then turn up beam current again. The beam current used was approximately 60-80 milliamps (setting "5-6" on the control). It may take as long as 1 minute or 1 minute, 15 seconds, to achieve the proper platinum/carbon evaporation. Timing is not so important as is the careful attention to the vacuum and visualization of the deposition process. By this technique, a layer having a thickness on the order of 5 to 10 angstroms (an essentially mono- to di- atomic layer) of platinum and carbon was contoured onto the specimen surface. This represents an amount which is small enough to achieve the very high resolution in accordance with the invention.

During this evaporation, the stage was rotating at a speed of 1 revolution/sec. The platinum/carbon evaporation should be a very light greyish/brown on the paper, about 1-4 mm from the stage. This is a novel approach and the amount of platinum/carbon is much less than one would use by conventional means.

Where a quartz crystal monitor is available, one will desire to apply the evaporant such that a uniform layer of no more than about 5 to 10 angstroms is applied to the specimen. The quartz crystal monitor is typically used by those skilled in the art of freeze fracture/freeze etching.

8. Carbon Evaporation

After application of the heavy metal evaporant, it was desirable to apply a relatively thick (about 20 to 100 angstroms) layer of carbon as a backing, to complete the replica.

Immediately prior to starting this operation, the stage rotation was decreased so that it moved very slowly (approx. 1 rev/5-10 sec). The setting was near (0) on the rotation control. However, the stage was allowed to continuously rotate.

To achieve a uniform layering of carbon, the carbon was evaporated for 16-20 sec. While carbon application is not particularly critical, it was nevertheless thought to be important that not too much carbon be applied, as too much carbon tends to affect electron beam transmission. However, there is no need to worry about the vacuum at this point, yet a vacuum of $10^{-5}$ to $10^{-6}$ Torr was typically employed.

9. Specimen Recovery

Concave depressions in a porcelain plate were filled with distilled water. One depression was filled with 70% ETOH. Frozen specimens were brought to a work table while still inside of the double replica holder. The wooden holders were removed one-by-one, using fine forceps, specimens were gently removed and rapidly transferred first to the ETOH well for 0.5 sec, then to distilled water. Typically, the specimen was still be attached to holder in the bottom of the concave well. The tip of forceps was then gently used to "ring" the replica and "fish it out" from the holder. Since the copper holders were to be reused, they were not allowed to dry. The holders were transferred to distilled water (to be cleaned later).

Wells of another porcelain plate were filled with chromic acid/sulfuric acid solution (5%/50%). Using a flat glass rod, the specimen was gently lifted from the concave well. The organic material was facing downward, and the specimen was gently transferred to the acid, slowly lowering the glass rod, leaving the replica floating, clean side face up. The specimens were allowed to clean overnight.

10. Final Cleaning Operations

A. Copper holders were cleaned in distilled water and wiped dry with a tissue. ETOH or soap was not used.

B. It was important that all liquid nitrogen components in the bell jar be dry before rerun or closed down for the day. A hair dryer was used to gently warm the stage area to room temperature. Final drying was done at ambient room temperature, as compressed air is going through the microtome arm and stage. Compressed air was used to remove all water from the flexible bellows and gold seals of the microtome arm. Failure to do this may cause ice formation during subsequent runs, which will expand the metal joints and ruin the vacuum.

95% ETOH was used to clean the o-ring of the bell jar, and the bell jar was then immediately sealed for storage pending use.

11. Measuring of Replica Thickness

To confirm that the technique provides a replica having a thickness of generally less than 10 angstroms, a simple technique can be employed. One of the replicas can be removed and embedded in a plastic embedding medium formulated for electron microscopy use (Spurr's Embedding Medium). This is done as follows:

(A) Dehydrate the replica in an ascending ETOH/distilled water series (25%, 50%, 75%, 100%) at 15 minutes per step;

(B) Infiltrate with a 25%, 50%, 75%, 100% Spurr/ETOH or Spurr/acetone mix - a period of 4 hours per step is nominal;

(C) Transfer replica to a 100% Spurr's resin in flat embedding mold;

(D) Orient replica 90° to mold surface to be microtomed; and (E) Polymerize at 60° C. for 12 hours.

The embedded replica is then thin sectioned by conventional means, so as to achieve a cross-sectional view, perpendicular to the plane of the replica. The thin section is then viewed by conventional TEM on a goniometer stage. The angle of incidence between the microscopic view and the cross-section of the replica is varied by the goniometric stage, and the smallest apparent cross-sectional thickness of the platinum/carbon layer readily measured. Dark field conditions allow an easy discernment of the platinum/carbon layer from the carbon backing film.

EXAMPLE II

VISUALIZATION OF TERMINAL COMPLEXES FROM VAUCHERIA HAMATA

The above-described high resolution replica techniques were applied to investigate the structure of cellulose synthesizing complexes (terminal complexes or TCs) and microfibril assembly in the xanthophycean alga *Vaucheria hamata*. *Vaucheria hamata* TCs are roughly rectangular complexes composed of many diagonal rows of particles. The particles which comprise the TC are ellipsoides or rectangular prisms. The longer axis measures $11.6 \pm 2$ nm (1 nm = 10 angstroms) and the shorter axis $7.5 \pm 1$ nm. Each particle consists of two subunits. The number of particles in a single diagonal row varied from 2 to 10 (mean $6.7 \pm 2$). Sixty percent of these rows contained 6 to 8 particles. Using the high resolution techniques of the present invention, the inventors were able to successfully identify interconnecting filaments extending between the subunits of the particles, the filaments measuring from 4.9 to 12 angstroms in width. This is an order of magnitude greater resolution than has previously been obtained using replica technology.

Algal Culture and Preparation of Material Freeze-Etching

A unialgal culture of Vaucheria hamata (Walz) was maintained in a medium containing 0.5% ES-enrichment (Provasoli et al. (1957), *Arch. Mikrobiol.*, 25:392), supplemented with 2% soil water extract (Ott and Brown (1972), *Br. Phycol. J.*, 7:361). The medium was sterilized by autoclaving for 15 min, and unialgal filaments were maintained in deep Pyrex Petri dishes of medium. Algae were cultured at 15° C on a 12 hour light (20000–40000 lux)/12 hour dark cycle.

Material to be used for freeze-etching was placed in fresh medium for 10 min, then transferred to 40% natural seawater of 0.1 M NaCl for 10 minutes to induce plasmolysis. The plasmolysed cells were rinsed once in fresh medium, cut into 2-3 mm segments with scissors and returned to the medium. Protoplasts within the old cell wall began to regenerate new cell walls after four hours in culture. The time course for wall regeneration was established by staining cells with a fluorescent dye which binds to cellulose (0.01% Tinopal LPW), followed by examination with UV epifluorescence microscopy.

Freeze Etching

Unfixed, uncryoprotected cells were mixed with yeast paste, mounted on copper double replica specimen supports and quickly frozen in liquid propane cooled with liquid nitrogen. The specimen supports were then transferred to liquid nitrogen and inserted into a Balzers double replica holder which was placed in a BA 360M freeze etch device. Cells were fractured at from $-110°$ up to $-130°$ C. at $1 \times 10^{-5}$ to $10^{-6}$ Pa and etched for 90 seconds. Specimens were rotary shadowed at 30° (1 rps) or unidirectionally shadowed at 45° with Pt-C delivered by an electron gun operating at 2000V and 90 mA. Replicas were released in distilled water and cleaned with 50% sulfuric acid containing 5% sodium dichromate overnight at room temperature. Replicas were picked up on Formvar coated grids were examined with a Philips EM420 electron microscope operating at 80 kV.

Results

TC Structure

The presumptive terminal cellulose synthesizing complexes (TCs) of Vaucheria were roughly rectangular in surface view and were composed of many diagonal rows of particles. These structures were observed only on the P-face of the plasma membrane. TCs were not observed on the E-face, even in fields where microfibril termini were torn through the membrane.

Two types of TCs were observed: (1) TCs associated with microfibril (MF) impressions which are presumably active in MF synthesis (MF-active), (2) TCs unassociated with MF impressions which are in stages of nascent synthesis or are presumably inactive. Both groups were found interspered within the same membrane, suggesting that presence or absence of a MF impression was not an artifact of specimen preparation. Microfibril impressions associated with MF-active TCs, however, the MF impression was offset.

The length of MF-active TCs in 6 hr cultures varied from 100 to 360 nm with a mean value of 180±53.2 nm (160 TCs measured) while their width varied from 50 to 80 nm (mean 61.8±6.1 n,). MF-inactive TCs were generally shorter and slightly wider than their MF-active counterparts. Their length varied from 30 to 300 nm (mean 122±51.7 nm, 207 TCs measured), and heir width from 45 to 100 nm (mean 64±8.4 nm, 207 TCs measured), respectively. Similar TC length and width variation was observed for all ages of cultures examined.

TC length was also found to be correlated with the number of diagonal rows in the complex in both MF-active and MF-inactive TCs. The number of diagonal rows per MF-active TCs varied from 6 to 25 with an average of 14±4. MF-inactive TCs are composed of from 2 to 23 rows: the average number is 9.5±4.

The particles comprising the diagonal rows appeared to be ellipsoids or rectangular prisms. The long edge measures 11.6±1.8 nm and the shorter side 7.45±1 nm (115 particles measured). TC particles are much smaller than most other intramembranous particles found in the same membrane plane. Non-TC intramembranous particles have a mean diameter of 11.2±2.7 (280 particles measured).

Figure 1:
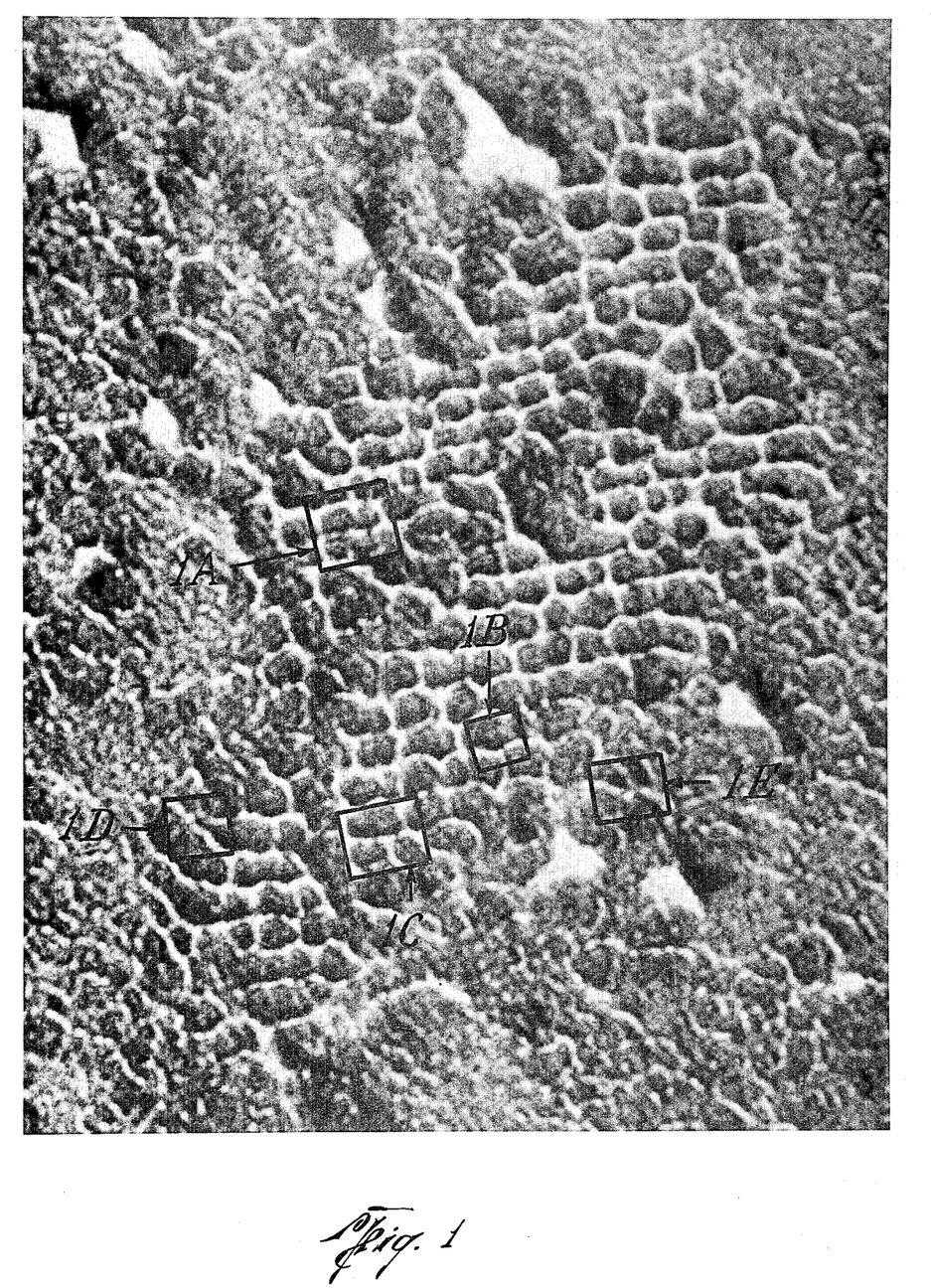
FIG. 1 is an electron micrograph of freeze-etched plasma membrane of Vaucheria showing microfibril-inactive terminal complexes. The magnification is about 801,000 x. Particles which make up the diagonal rows are apparently composed of two subunits, connected by fine strands (arrows). These strands have a width measured to be about 3.7 to about 10 angstroms.
Figure 1A:
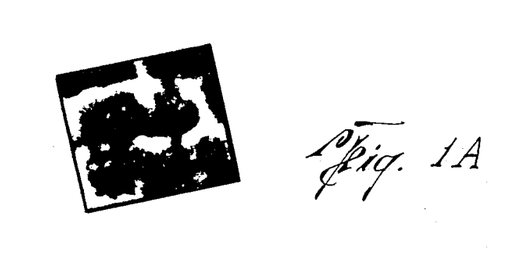
Figure 1B:
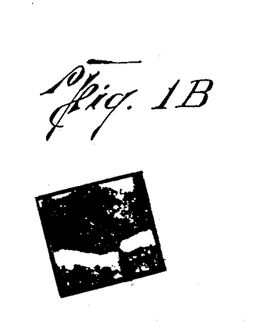
Figure 1C:
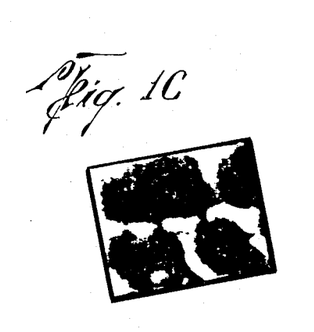
Figure 1D:
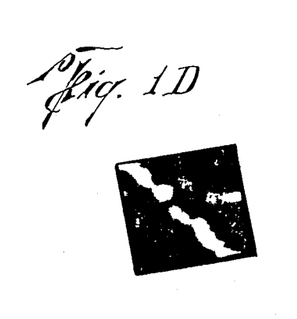
Figure 1E:
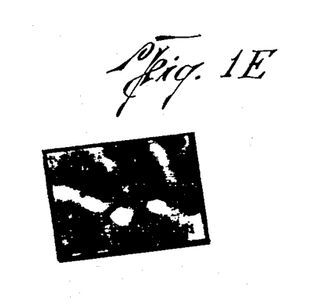

In FIG. 1 is shown a typical electron micrograph of a replica of a Vaucheria TC consisting of diagonal rows of particles. The electron micrograph represents a magnification of 801,000 ×. The strands connecting the TC subunits can be measured as small as 4.9 angstroms in width, and range in size from about 4.9 to 15 angstroms. The filaments shown by enclosure box numbers 2 and 5 are approximately perpendicular to each other and exhibit a thickness of 4.9 to 6.2 angstroms In enclosure box number 1, several interconnecting filaments are shown having an average thickness of about lo to 11 angstroms.

EXAMPLE 3

DEMONSTRATION OF RESOLUTION OF PHOSPHOLIPID FATTY ACID SIDE CHAINS USING HIGH RESOLUTION REPLICAS

Materials and Methods

1. A phospholipid mixture containing phospholipids with two different fatty acid chainlengths was prepared into liposomes containing the following: 4.1 mg of 14:0/14:0 phosphatidylcholine plus 2.0 mg 18:0/18:0 phosphatidylcholine in 0.2 ml of 0.7% NaCl.

Figure 2:
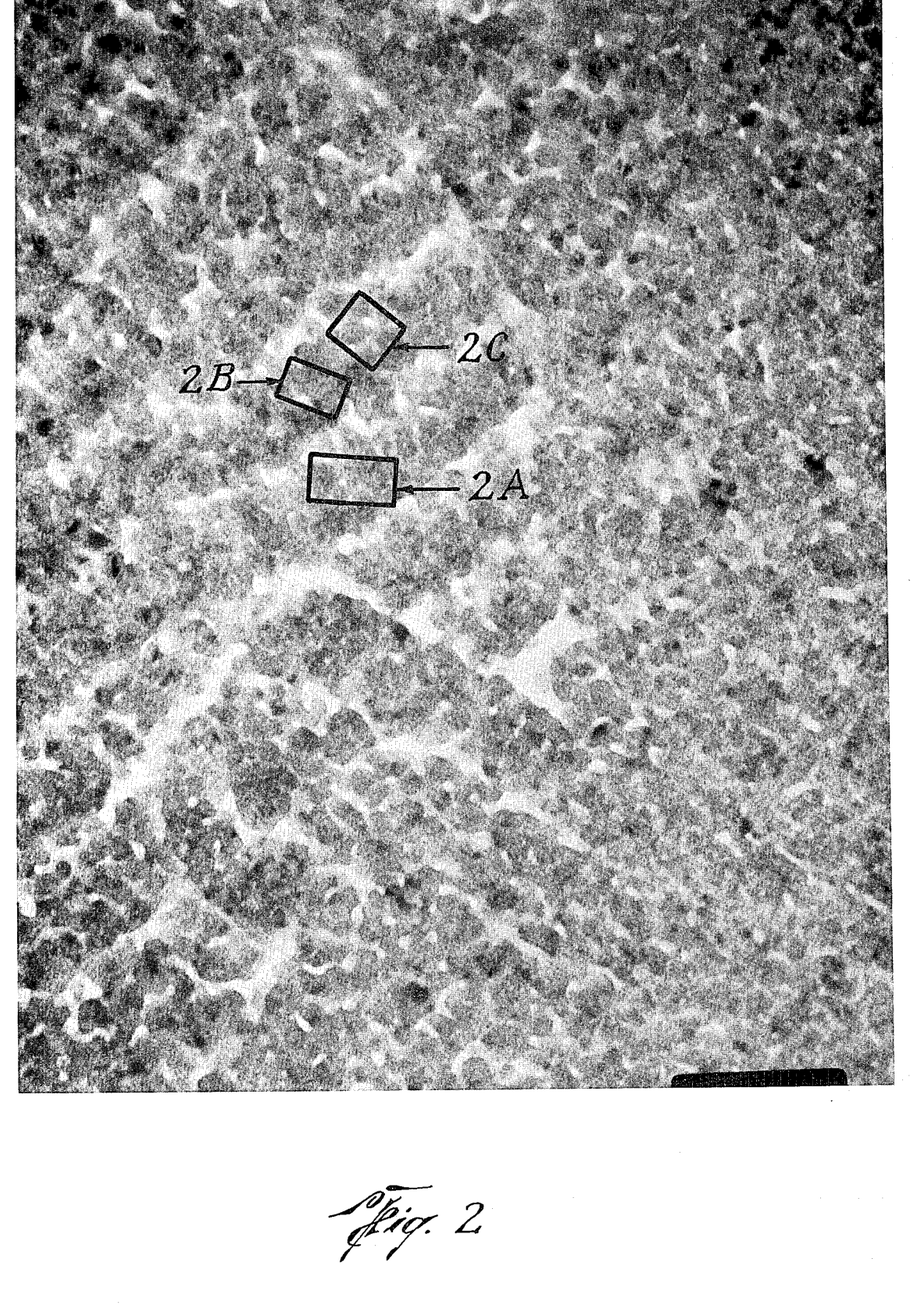
FIG. 2 is an electron micrograph of a replica of the fractured surface of a phospholipid membrane revealing the hydrophobic interior of one of the bimolecular leaflets. Note the phospholipid molecules with their fatty acid side chains indicated within the various numbered boxed enclosures. Some side chains have been dislocated due probably to the forces involved in the fracture process. The fatty acid side chains in this picture measured from 3.5 to 4 angstroms in diameter. Several side chains are depicted in the three boxed enclosures. The scale bar is 9.0 nanometers, magnification is 998,000x.
Figure 2A:
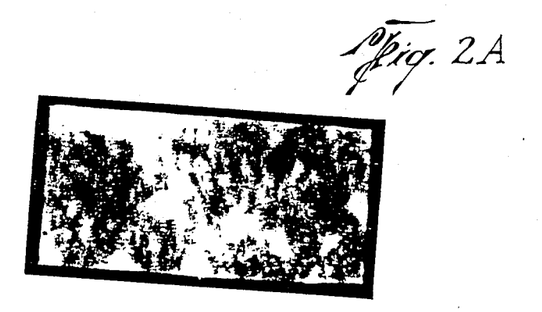
Figures 2B, 2C:
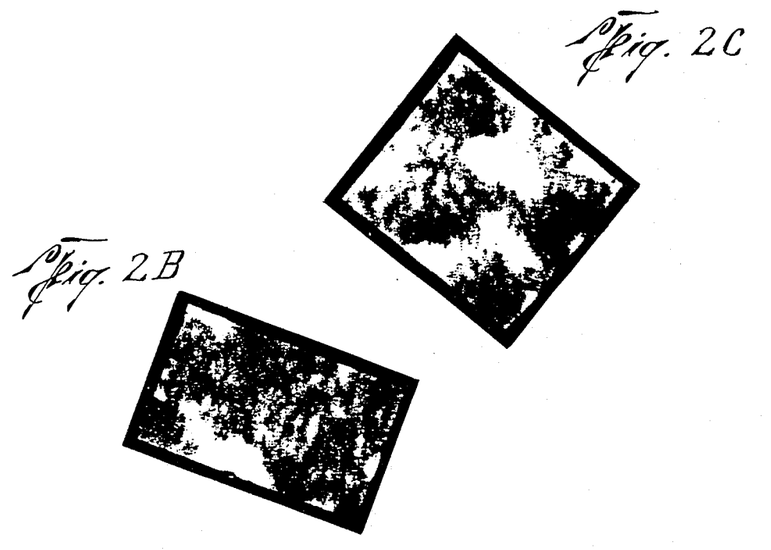

2. This mixture has a phase transition temperature of 58 C and 23 C. One sample was heated to 60° C., then immediately quenched in liquid propane and prepared for freeze etching as described above. The other sample was quenched in liquid propane from room temperature (25° C.) and processed as above. Upon freeze etching, both samples showed characteristic fingerprint patterns in the phospholipid vesicles, suggesting localized crystallization during freezing. Phospholipid membrane vesicles form a bimolecular leaflet membrane arrangement. During the fracture process, this membrane was split down its hydrophobic interior. This exposed surface was replicated in the manner of Example I and the resultant replica revealed the presence of individual fatty acid side chains protruding into the hydrophobic interface (see FIG. 2). Some of these fatty acid side chains lie at various angles of inclination, probably due to the forces involved in the fracture process. The four fatty acid side chains depicted in the boxed enclosure #2 of the tissue were measured at 4 angstroms in diameter. Moreover, some of the fatty acid side chains measured less than 3.5 angstroms in diameter.

3. The dimensions of phospholipids are well known. The head contains a surface area of 40 angstroms$^2$. The average diameter of artificial phospholipid liposome particles is 106 angstroms (see Mullet et al. (1980) Plant Physiol., 65:814; Dunahay and Staelehin (1985) Plant Physiol., 78:606).

The diameter of the individual fatty acid side chains is approximately 3-4 angstroms. (Refs: de Bony and Dennis (1981), Biochemistry, 20:5256; Mattai et al. (1987) Biochemistry, 26:3287)

The foregoing description has been directed to particular embodiments of the invention in accordance with the requirements of the Patent Statutes for the purposes of illustration and explanation. It will be apparent, however, to those skilled in this art that many modifications and changes in the procedure set forth will be possible without departing from the scope and spirit of the invention. It is intended that the following claims be interpreted to embrace all such modifications and changes of the use of other features, all as would be apparent to one skilled in the art after having the benefit of this description of the invention.

What is claimed is:

1. A method for preparing an improved high resolution replica, the method including the steps of:
   (a) placing a specimen for which the replica is to be made upon a rotatable platform in an enclosable system;
   (b) evacuating the system to form a vacuum sufficient to provide a mean free path for a selected evaporant;
   (c) rotating the specimen;
   (d) forming a replica of the specimen by a process which includes uniformly directing a selected evaporant onto the surface of the rotating specimen to provide a layer having a thickness of less than 10 angstroms.

2. The method of claim 1 wherein the selected evaporant comprises a heavy metal evaporant, and the system is evacuated to at least $10^{-6}$ Torr prior to forming the replica.

3. The method of claim 2 wherein the vacuum is maintained at a level of at least $10^{-5}$ Torr during formation of the replica.

4. The method of claim 1 wherein the specimen is rotated at from about 0.5 to about 2 rotations per second.

5. The method of claim 4 wherein the specimen is rotated at about 1 rotation per second.

6. The method of claim 1 wherein the evaporant is directed onto the specimen from an angle of from about 5 to about 80° with respect to the plane of the platform.

7. The method of claim 6 wherein the evaporant is directed onto the specimen at an angle of from about 10° to about 45°.

8. The method of claim 6 wherein the evaporant is directed onto the specimen at an angle of about 25°.

9. The method of claim 1 wherein the selected evaporant comprises a heavy metal evaporant selected from the group consisting of platinum, gold, palladium, tungsten, phosphotungstate, and tantalum.

10. The method of claim 2 or 9 wherein the evaporant further comprises carbon.

11. The method of claim 1 wherein the layer comprises a thickness of generally less than 5 angstroms.

12. The method of claim 1 wherein forming the replica includes coating the layered specimen with a backing to stabilize the replica.

13. The method of claim 12 wherein the backing comprises a carbon evaporant.

14. The method of claim 1 wherein the specimen comprises a frozen biological specimen, and the system is maintained at a temperature of less than at least $-100°$ C. during formation of the replica.

15. The method of claim 14 wherein the system is maintained at a temperature of between about $-110°$ C. and about $-130°$ C. during formation of the replica.

16. The method of claim 14 wherein the system is maintained at a temperature of between about $-130°$ C. and about $-150°$ C. during formation of the replica.

17. The method of claim 14 wherein the biological specimen is fractured.

18. The method of claim 14 wherein the specimen is etched.

19. The method of claim 1 wherein the specimen comprises a carbon fiber, or metallic surface or synthetic polymer.

20. The method of claim 1 wherein the specimen comprises a integrated circuit board or computer chip.

* * * * *